United States Patent
Hu et al.

(10) Patent No.: US 11,516,397 B2
(45) Date of Patent: Nov. 29, 2022

(54) CAMERA MODULE AND METHOD FOR CONTROLLING THE SAME

(71) Applicant: TDK TAIWAN CORP., Taoyuan (TW)

(72) Inventors: Chao-Chang Hu, Taoyuan (TW);
Chen-Hsien Fan, Taoyuan (TW);
Yi-Liang Chan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 55 days.

(21) Appl. No.: 16/797,259

(22) Filed: Feb. 21, 2020

(65) Prior Publication Data

US 2020/0195850 A1 Jun. 18, 2020

Related U.S. Application Data

(63) Continuation of application No. 15/476,101, filed on Mar. 31, 2017, now Pat. No. 10,616,487.
(Continued)

(30) Foreign Application Priority Data

Feb. 18, 2017 (TW) .................................. 106105424

(51) Int. Cl.
*H04N 5/232* (2006.01)
*H04N 5/225* (2006.01)

(52) U.S. Cl.
CPC ....... *H04N 5/23287* (2013.01); *H04N 5/2253* (2013.01); *H04N 5/2254* (2013.01); *H04N 5/2257* (2013.01)

(58) Field of Classification Search
CPC ............. H04N 5/23287; H04N 5/2253; H04N 5/2254; H04N 5/2257; H04N 5/2328;
(Continued)

(56) References Cited

U.S. PATENT DOCUMENTS

2008/0278590 A1  11/2008  Tanimura et al.
2009/0295986 A1* 12/2009  Topliss .................. G02B 7/026
                                          348/374
(Continued)

FOREIGN PATENT DOCUMENTS

CN       1677155 A    10/2005
CN     102739950 A    10/2012
(Continued)

OTHER PUBLICATIONS

Chinese Office Action dated May 8, 2020 for the corresponding Application No. 201710153839.2, 5 pages.

*Primary Examiner* — Sinh Tran
*Assistant Examiner* — Zhenzhen Wu
(74) *Attorney, Agent, or Firm* — Muncy, Geissler, Olds & Lowe, P.C.

(57) ABSTRACT

A camera module is provided, disposed in an electronic device, including a base, a holder, an image sensor, a bottom, and a first biasing element. The base is fixed to a casing of the electronic device. The holder is configured to hold an optical lens and connects to the base. The image sensor is supported by the bottom. The base is situated between the holder and the bottom. The first biasing element connects to the bottom and the base, and forces the bottom and the image sensor to move relative to the base.

20 Claims, 13 Drawing Sheets

Related U.S. Application Data

(60) Provisional application No. 62/316,845, filed on Apr. 1, 2016.

(58) Field of Classification Search
CPC .............. H04N 5/2251; G03B 2205/00; G03B 2205/0007; G03B 2205/0015; G03B 2205/0023; G03B 2205/0053; G03B 2205/0076; G03B 2205/0061; G03B 2205/0069; G03B 2205/0084; G02B 27/646

See application file for complete search history.

(56) References Cited

U.S. PATENT DOCUMENTS

| | | |
|---|---|---|
| 2011/0249131 A1 | 10/2011 | Topliss et al. |
| 2012/0019675 A1 | 1/2012 | Brown |
| 2013/0002933 A1 | 1/2013 | Topliss et al. |
| 2013/0162896 A1 | 6/2013 | Kang et al. |
| 2014/0028906 A1* | 1/2014 | Chen ........................ G03B 5/00 348/375 |
| 2014/0340574 A1 | 11/2014 | Han |
| 2015/0304561 A1 | 10/2015 | Howarth et al. |
| 2016/0330375 A1* | 11/2016 | Sekimoto ............. H04N 5/2253 |
| 2017/0075192 A1* | 3/2017 | Brown ..................... G03B 5/04 |
| 2017/0108705 A1* | 4/2017 | Yu ............................ G03B 5/00 |
| 2017/0171440 A1* | 6/2017 | Park .................... G02B 27/646 |
| 2017/0192247 A1 | 7/2017 | Okuda |
| 2017/0219842 A1* | 8/2017 | Howarth .................. G03B 5/02 |
| 2018/0149142 A1* | 5/2018 | Bunting ................... G02B 7/08 |
| 2018/0284475 A1* | 10/2018 | Howarth ............. G02B 27/646 |
| 2018/0321503 A1* | 11/2018 | Brown ................ G02B 27/646 |
| 2019/0141248 A1* | 5/2019 | Hubert ............... H04N 5/23287 |

FOREIGN PATENT DOCUMENTS

| | | |
|---|---|---|
| CN | 103576414 A | 2/2014 |
| WO | WO2015/104908 A1 | 7/2015 |

\* cited by examiner

CAMERA MODULE AND METHOD FOR CONTROLLING THE SAME

CROSS REFERENCE TO RELATED APPLICATIONS

This application is a Continuation of application Ser. No. 15/476,101, filed on Mar. 31, 2017, which claims the benefit of U.S. Provisional Patent Application No. 62/316,845, filed on Apr. 1, 2016, and Taiwan Patent Application No. 106105424, filed on Feb. 18, 2017, the entirety of which are incorporated by reference herein.

BACKGROUND OF THE INVENTION

Field of the Invention

The application relates in general to a camera module, and in particular to a camera module having a movable and rotatable image sensor.

Description of the Related Art

Thanks to ongoing technological development, recent electronic devices (such as tablet computers and smartphones) usually include a lens module capable of aiding in photography or recording video. However, an image may come out blurry if the user shakes the lens module in the electronic device. To improve image quality, it is increasingly important to design a shockproof lens module.

BRIEF SUMMARY OF INVENTION

To address the deficiencies of conventional products, an embodiment of the invention provides a camera module, disposed in an electronic device, including a base, a holder, an image sensor, a bottom, and a first biasing element. The base is affixed to a casing of the electronic device. The holder is configured to hold an optical lens and connects to the base. The image sensor is supported by the bottom. The base is situated between the holder and the bottom. The first biasing element connects to the bottom and the base, and forces the bottom and the image sensor to move relative to the base.

In some embodiments, the first biasing element comprises a shape-memory alloy.

In some embodiments, the first biasing element forces the bottom and the image sensor to rotate around an optical axis of the optical lens.

In some embodiments, the camera module further comprises a plurality of first biasing elements forcing the bottom and the image sensor to linearly move relative to the base.

In some embodiments, the camera module further comprises a plurality of first biasing elements, wherein the bottom has a rectangular structure which defines a diagonal line, and the first biasing elements are substantially symmetrical to the diagonal line.

In some embodiments, the first biasing element is angled and extended with respect to an upper surface of the bottom to connect the bottom with the base.

In some embodiments, the camera module further comprises a rolling element disposed between the base and the bottom.

In some embodiments, the camera module further comprises a first elastic element connecting the bottom with the base, wherein the first elastic element is disposed between the bottom and the base along the central axis of the base.

In some embodiments, the camera module further comprises a flexible arm connecting to the bottom and the first biasing element, wherein the first biasing element comprises a shape-memory alloy, and the image sensor is moved relative to the base when the first biasing element contracts and forces the flexible arm to deform.

In some embodiments, the flexible arm has an L-shaped structure, and an end portion of the flexible arm connects to the base.

In some embodiments, the first biasing element is disposed around the bottom.

In some embodiments, the camera module further comprises a second biasing element comprising a shape-memory alloy and connecting the holder with the base, wherein the second biasing element deforms to force the holder and the optical lens to move relative to the base.

In some embodiments, the camera module further comprises a conductor formed on the base by insert molding or 3D molded interconnect device technology, wherein the conductor is electrically connected to the second biasing element.

In some embodiments, the camera module further comprises a second elastic element connecting to the base with the holder, wherein the second elastic element is electrically connected to the second biasing element.

An embodiment of the invention provides a method for controlling the camera module, wherein the camera module further comprises a plurality of first biasing elements respectively disposed on different sides of the bottom and connecting the bottom with the base, the method comprising applying a plurality of driving signals to the first biasing elements respectively to move the bottom and the image sensor relative to the base.

Another embodiment of the invention provides a method for controlling the camera module, comprising applying a driving signal to the first biasing element to rotate the bottom and the image sensor around the central axis of the base.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the camera modules are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
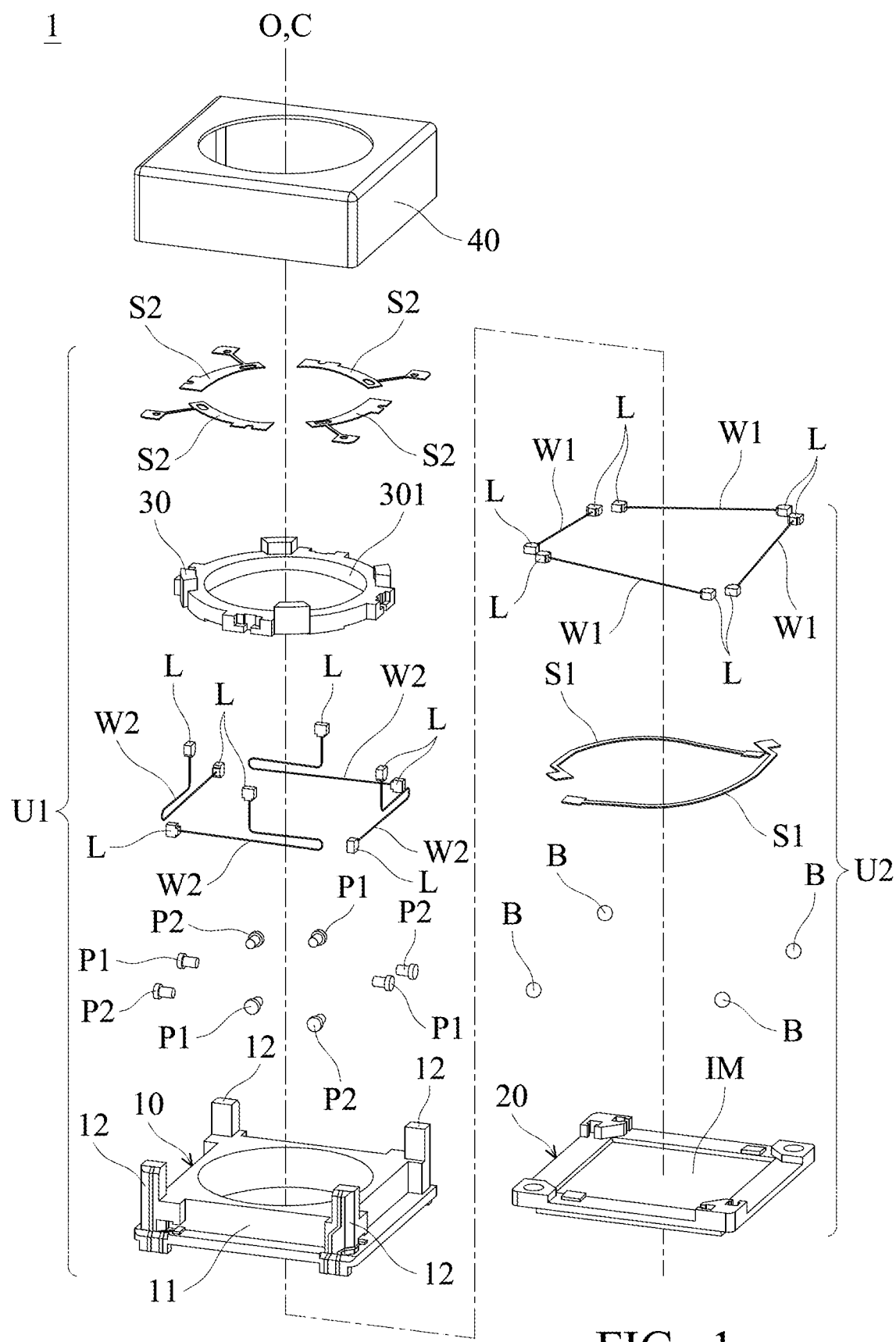
FIG. 1 is an exploded diagram of a camera module according to an embodiment of the invention.
Figure 2:
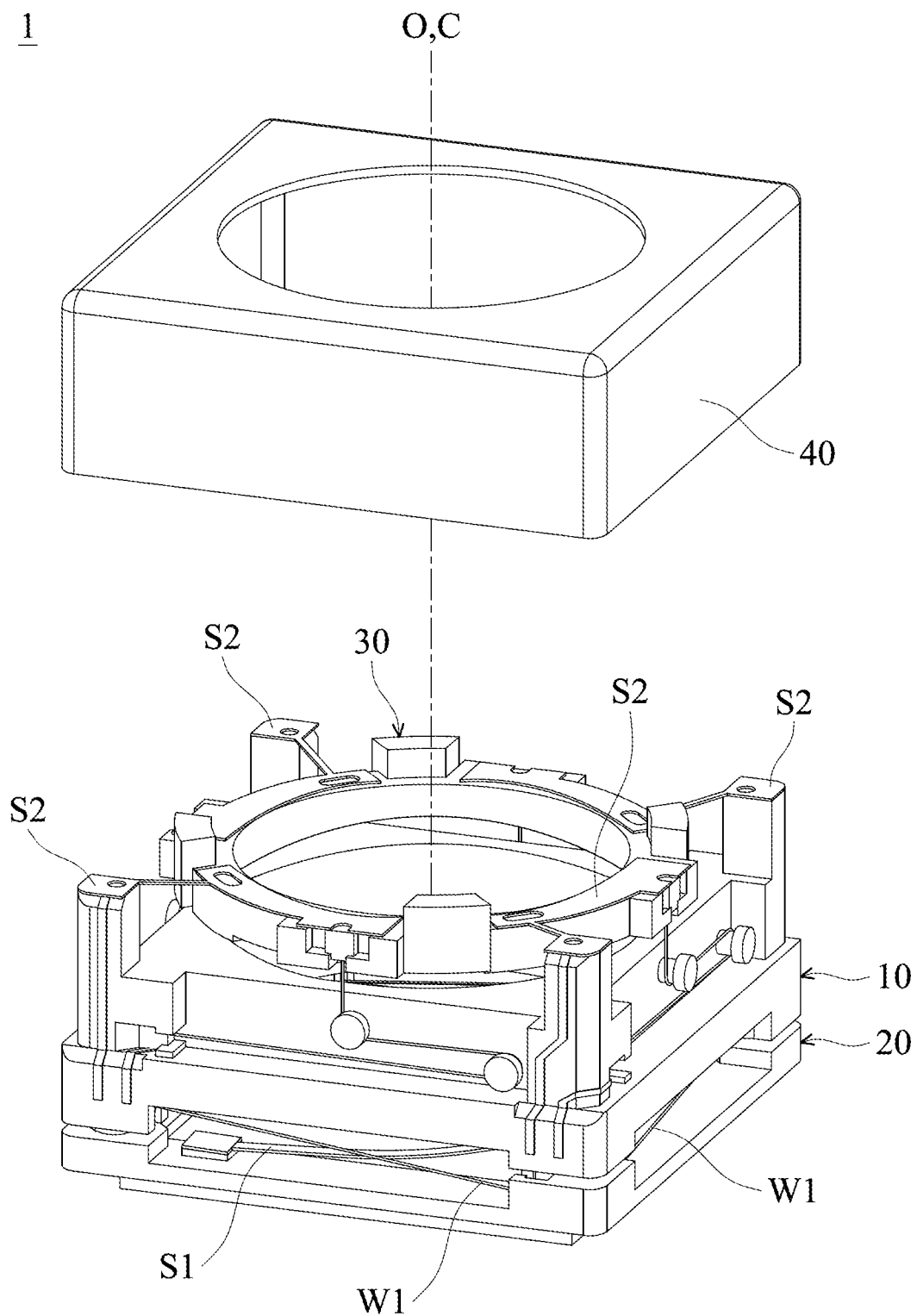
FIG. 2 is a schematic diagram of the first unit U1 and the second unit U2 after assembly and the housing 40 in FIG. 1.

FIG. 1 is an exploded-view diagram of a camera module 1 according to an embodiment of the invention, and FIG. 2 is a schematic diagram of a first unit U1 and a second unit U2 after assembly and the housing 40 of the camera module 1 in FIG. 1. The camera module 1 can be disposed in an electronic device, such as a camera, a tablet computer, or a cell phone, and it can be configured with an optical lens (not shown) and an image sensor IM disposed therein. The optical lens and the image sensor are movable with respect to each other, so that the camera module 1 has an auto-focusing (AF) function and optical image stabilization (OIS).

As shown in FIGS. 1 and 2, the camera module 1 comprises a first unit U1, a second unit U2, and a housing 40, wherein the first and second units U1 and U2 primarily include: a base 10, a bottom 20, a holder 30, a plurality of first elastic elements S1, a plurality of first biasing elements W1, a plurality of second elastic elements S2, a plurality of second biasing elements W2, and an image sensor IM. The bottom 20 is configured with the image sensor IM, and the holder 30 is configured with an optical lens (not shown) via a receiving space 301 thereof. The image sensor IM is configured to receive light from the outside of the camera module 1 and through the optical lens so that an image is acquired. The first elastic elements S1 and the first biasing elements W1 connect to the base 10 and the bottom 20, and the second elastic elements S2 and the second biasing elements W2 connect to the base 10 and the holder 30, wherein the base 10 is affixed to a casing of an electronic device. The connection between the base 10 and the bottom 20 will be described below.

Figure 3A:
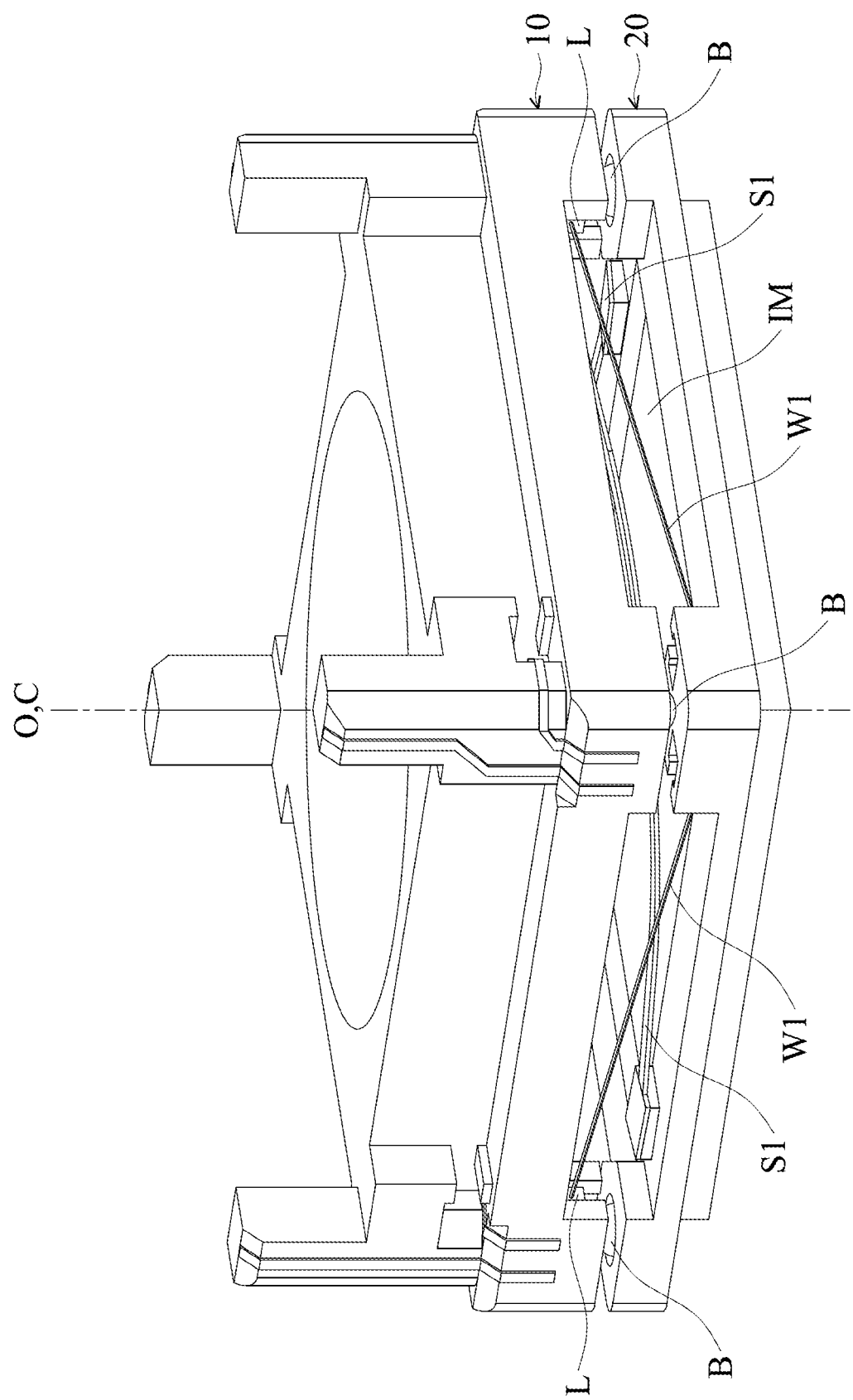
FIG. 3A is a schematic diagram of the base connected to the bottom via the first elastic elements and the first biasing elements in FIG. 1.
Figure 3B:
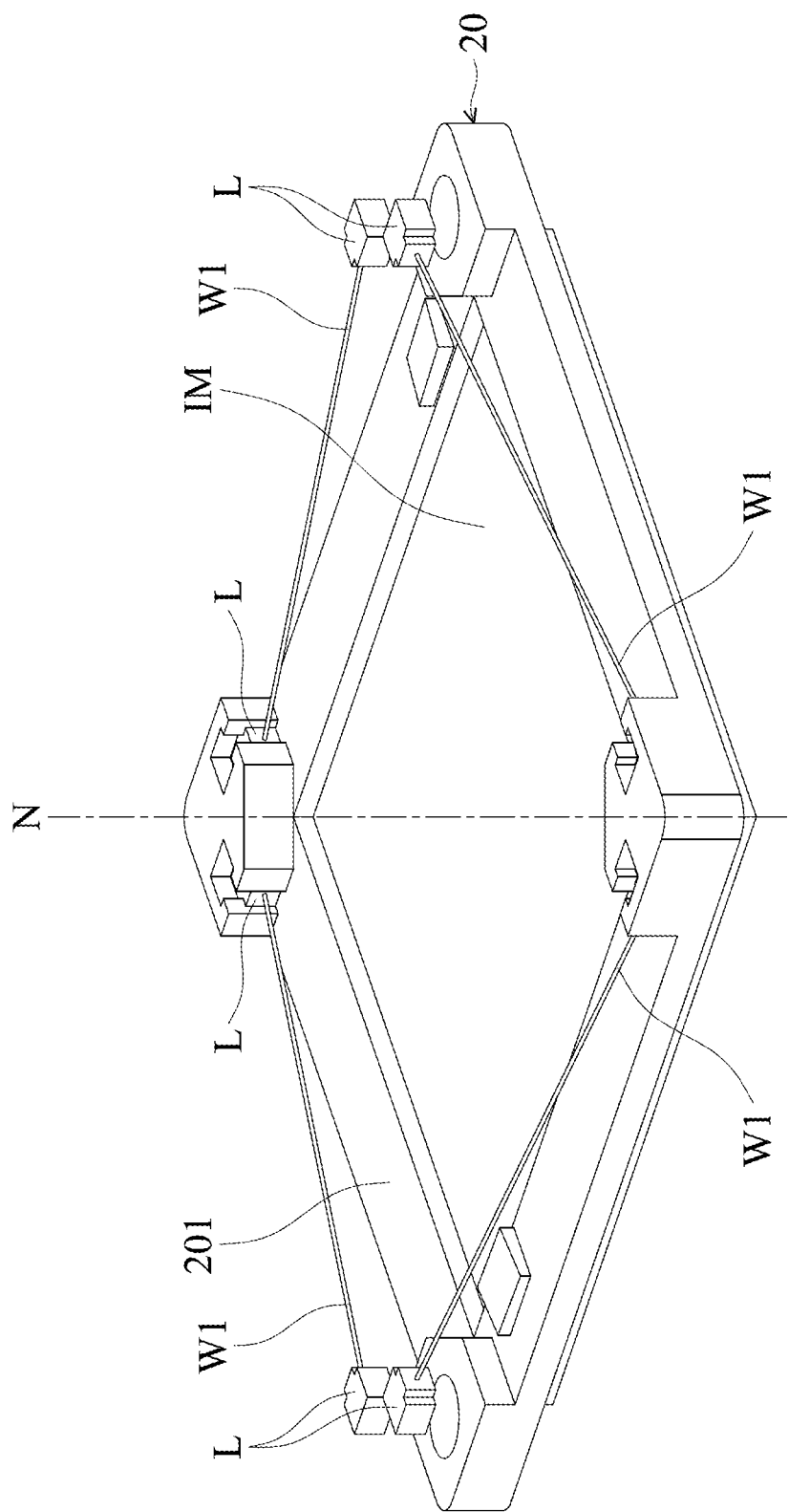
FIG. 3B is a schematic diagram of the bottom, the image sensor, the first biasing elements, and the conductive blocks in FIG. 3A.
Figure 4:
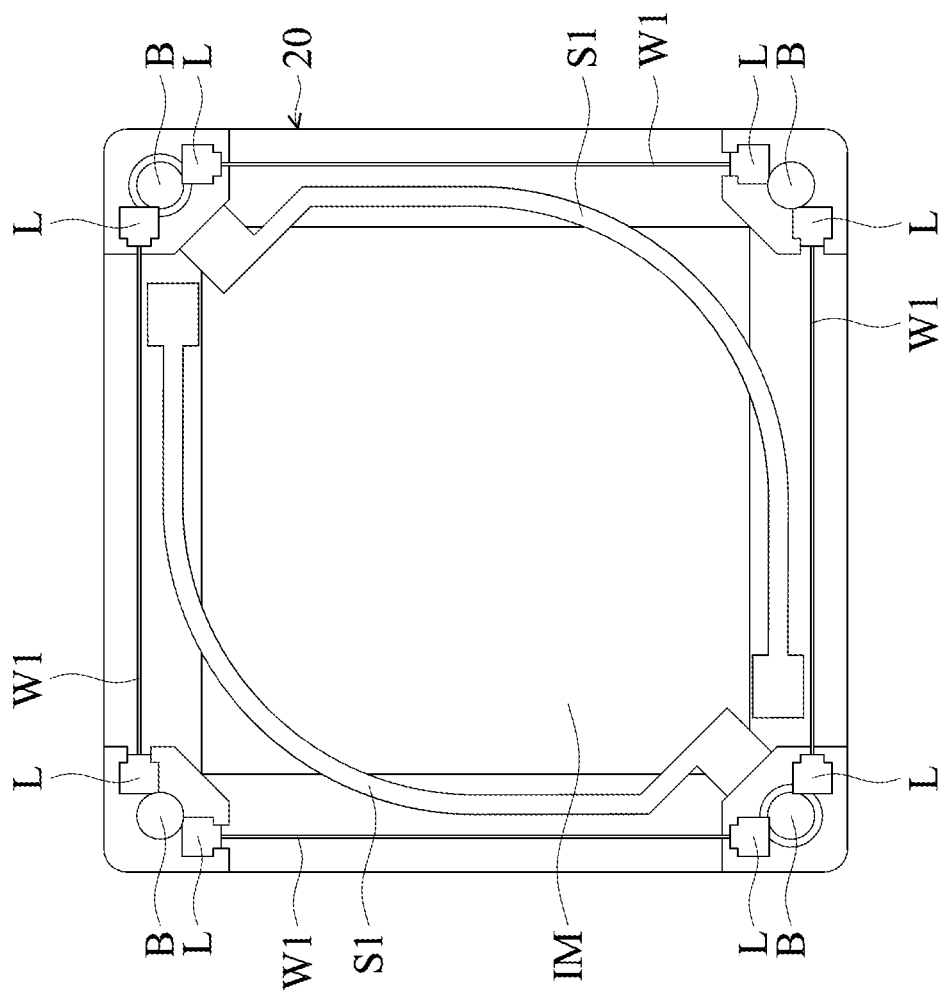
FIG. 4 is a schematic diagram of the mechanism of FIG. 3B with the rolling elements B assembled thereto.

FIG. 3A is a schematic diagram of the base 10 and the bottom 20, FIG. 3B is a schematic diagram of the bottom 20, the image sensor IM, the first biasing elements W1, and the conductive blocks L in FIG. 3B, and FIG. 4 is a bottom plan view diagram of the mechanism of FIG. 3B with a plurality of rolling elements B assembled thereto. As shown in FIG. 3A, the bottom 20 and the image sensor IM are disposed under the base 10 and connected to a lower surface of the base 10 via the first biasing elements W1 and the first elastic elements S1. Specifically, as shown in FIGS. 3A-3B and 4, four first biasing elements W1 are respectively disposed on the different sides of the bottom 20, and the two ends of each of first biasing elements W1 connect to conductive blocks L, respectively. The pair of conductive blocks L disposed on each side of the bottom 20 are respectively affixed to the bottom 20 and the base 10 (such as by an engaging means or an adhesive). Furthermore, the two ends of a pair of first elastic elements S1 respectively connect to the bottom 20 and the base 10, so that the bottom 20 and the base 10 are connected. It should be noted that the first elastic elements S1 connect to the base 10 and the bottom 20 along the direction of a central axis C of the base 10 and are disposed between the base 10 and the bottom 20.

The first biasing elements W1, such as wires comprising a shape-memory alloy (SMA), are also connected to the base 10 and the bottom 20, and their lengths can be changed by applying one or more driving signals (e.g., electrical current) to them from an external power source (not shown). For example, when applying driving signals to heat the first biasing elements W1, the first biasing elements W1 are able to deform (e.g., elongated or shortened). When the application of the driving signals is stopped, the deformed first biasing elements W1 will recover to their original lengths. In other words, by applying one or more appropriate driving signals, the lengths of the first biasing elements W1 can be controlled to move the bottom 20 and the image sensor IM relative to the base 10, to alter the posture of the bottom 20. Thus, the camera module 1 has the function of optical-shaking compensation and optical-image stabilization.

The first biasing elements W1, for example, may comprise a titanium-nickel (TiNi) alloy, a titanium-palladium (TiPd) alloy, a titanium-nickel (TiNiCu) alloy, a titanium-nickel-palladium (TiNiPd) alloy, or a combination thereof.

Still referring to FIG. 3A, a plurality of conductive wires (not shown) can be formed on the base 10 and the bottom 20 by insert molding or 3D molded interconnect device (MID) technology and electrically connect to the conductive blocks L. Thus, the four first biasing elements W1 form four respective independent circuits, whereby driving signals (e.g., current) can be supplied to them respectively from an external power source via the wires, and the lengths of the first biasing elements W1 can be changed so that the bottom 20 and the image sensor IM can move relative to the base 10. It should be noted that, due to the wires formed on the base 10 and the bottom 20 by insert molding or 3D molded interconnect device (MID) technology, the number of components of the camera module 1 can be reduced and the dimensions thereof can be greatly reduced.

As shown in FIG. 3B, the four first biasing elements W1 are respectively disposed on the four sides of the bottom 20, and the first biasing elements W1 are angled and extended relative to an upper surface 201 of the bottom 20 and connect the bottom 20 with the base 10, wherein the upper surface 201 is substantially perpendicular to the central axis C. Furthermore, the substantially rectangular bottom 20 defines a diagonal line N, and the first biasing elements W1 are substantially symmetrical to the diagonal line N.

Still referring to FIG. 3A, when applying appropriate driving signals to the first biasing elements W1, the first biasing element W1 deforms (e.g., by being shortened or elongated) so that the bottom 20 and the image sensor IM are moved relative to the base 10, to achieve optical image stabilization. Two types of motion of the bottom 20 and the image sensor IM relative to the base 10 may be applied. The bottom 20 and the image sensor IM may linearly move relative to the base 10 in a direction that is substantially perpendicular to the central axis C of the base 10 or the optical axis O of the optical lens. Alternatively, the bottom 20 and the image sensor IM may rotate around the central axis C of the base 10. Thus, positional and angular compensation for the bottom 20 and the image sensor IM can be accomplished by controlling the deformation of the first biasing elements W1 which are respectively disposed on the different sides of the bottom 20. In addition, since the bottom 20 and the base 10 are also connected through the first elastic elements S1, when the drive signals have not yet been applied to the first biasing elements W1, the bottom 20 can be positioned at an initial position with respect to the base 10 by the first elastic elements S1.

Moreover, as shown in FIGS. 1, 3A and 4, the camera module 1 further comprises a plurality of rolling elements B, such as balls or rollers, disposed between the bottom 20 and the base 10. In particular, when the first biasing elements W1 are expanded or contracted to force the bottom 20 and the image sensor IM to move relative to the base 10, the bottom 20 and the image sensor IM can be guided to move in the horizontal direction by the rolling elements B. Thus, excessive friction on the mechanism due to contact between the bottom 20 and the base 10 can be effectively prevented.

Figure 5:
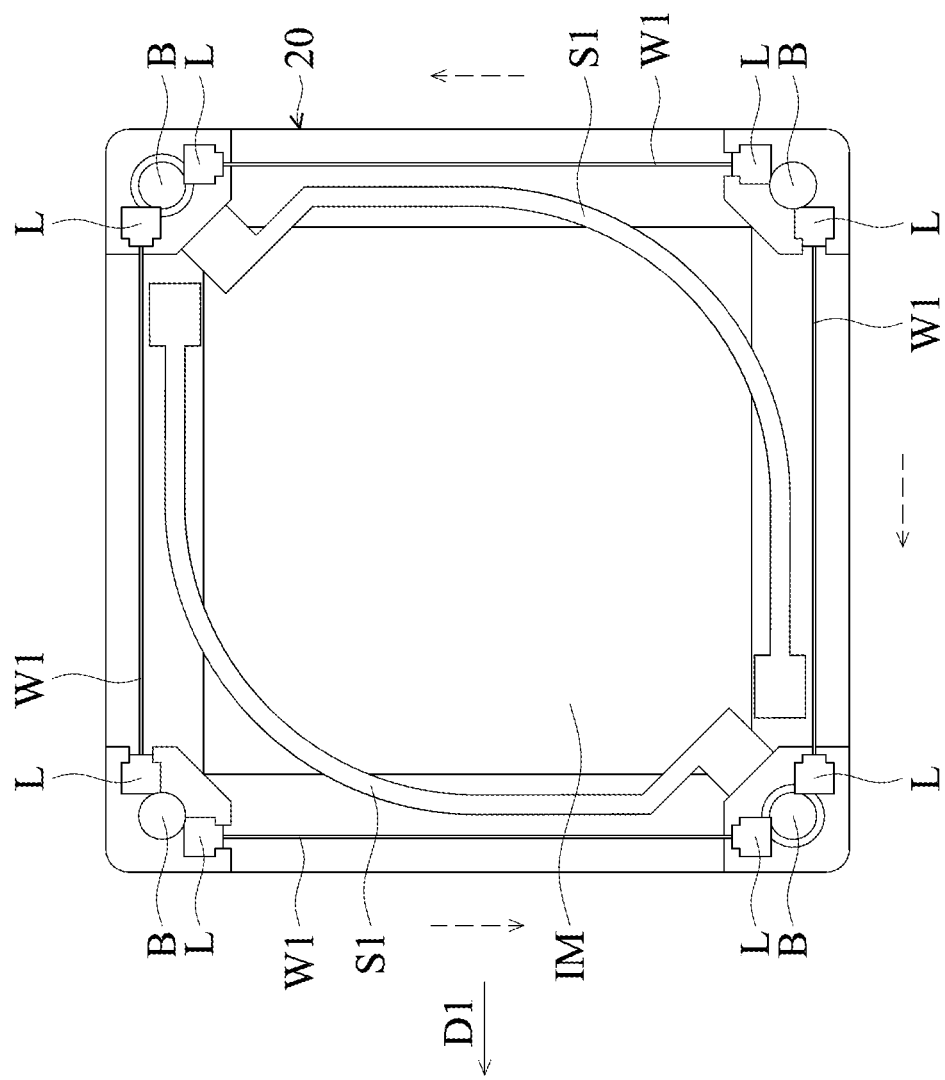
FIG. 5 is a schematic diagram of the bottom and the image sensor moving with respect to the base.
Figure 6:
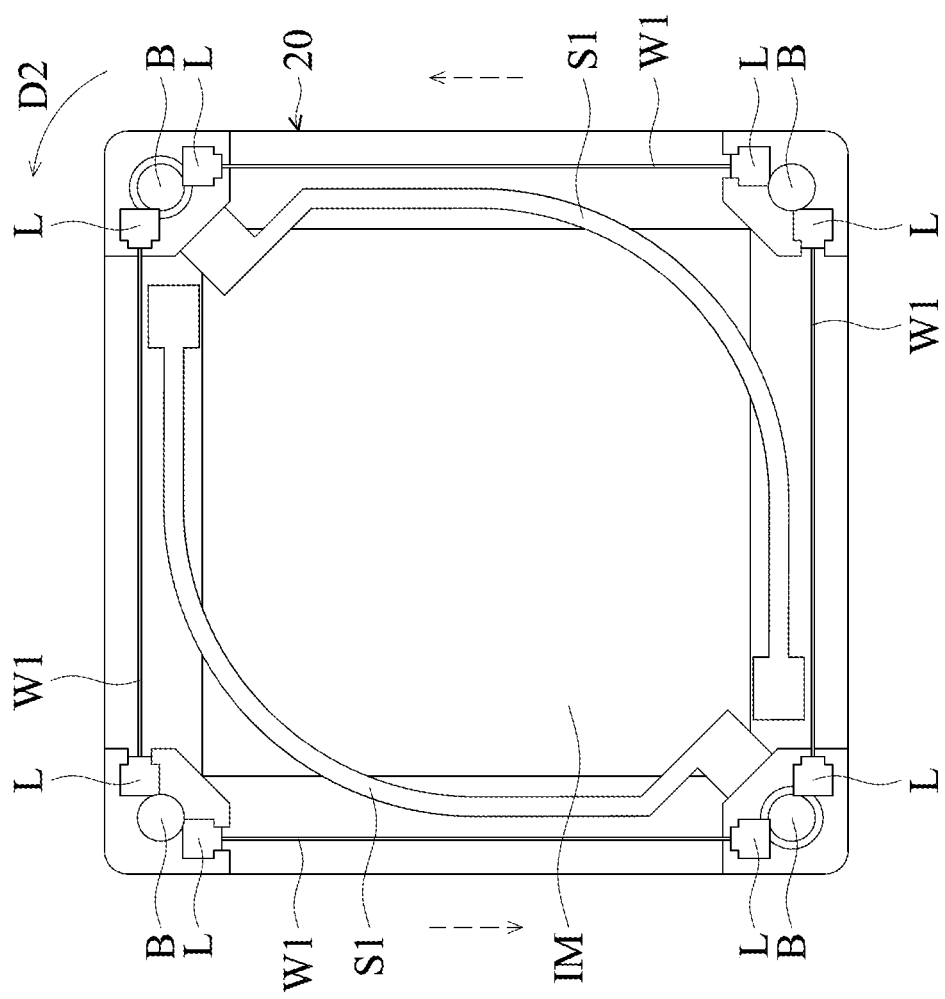
FIG. 6 is a schematic diagram of the bottom and the image sensor rotating with respect to the base.

As shown in FIG. 5, when appropriate drive signals are applied to the left, right and lower first biasing elements W1 in FIG. 5, these first biasing elements W1 can contract along the direction as the broken lines respectively indicate, so that the bottom 20 and the image sensor IM linearly move in a direction D1 with respect to the base 10. Similarly, as shown in FIG. 6, when applying appropriate drive signals to the two first biasing elements W1 (the left and the right ones), the two first biasing elements W1 can contract along the direction as the broken lines respectively indicate, so that the bottom 20 and the image sensor IM rotate in a direction D2 relative to the base 10. Thus, the bottom 20 and the image sensor IM can be rotated by the left and right contracted first biasing elements W1; and the bottom 20 and the image sensor IM can be linearly moved by the lower contracted first biasing element W1. Alternatively, only one first biasing element W1 may be provided on a side of the bottom 20 and a guiding mechanism correspondingly provided, to force the bottom 20 and the image sensor IM to linearly move or rotate relative to the base 10.

As described above, when an external power source applies an appropriate driving signal to the first biasing elements W1, the lengths of the first biasing elements W1 can be changed so that the image sensor IM moves relative to the optical axis O of the optical lens and the central axis C of the base 10. Therefore, when the optical lens shakes, optical-image compensation can be provided, to achieve high-quality images.

Figure 7:
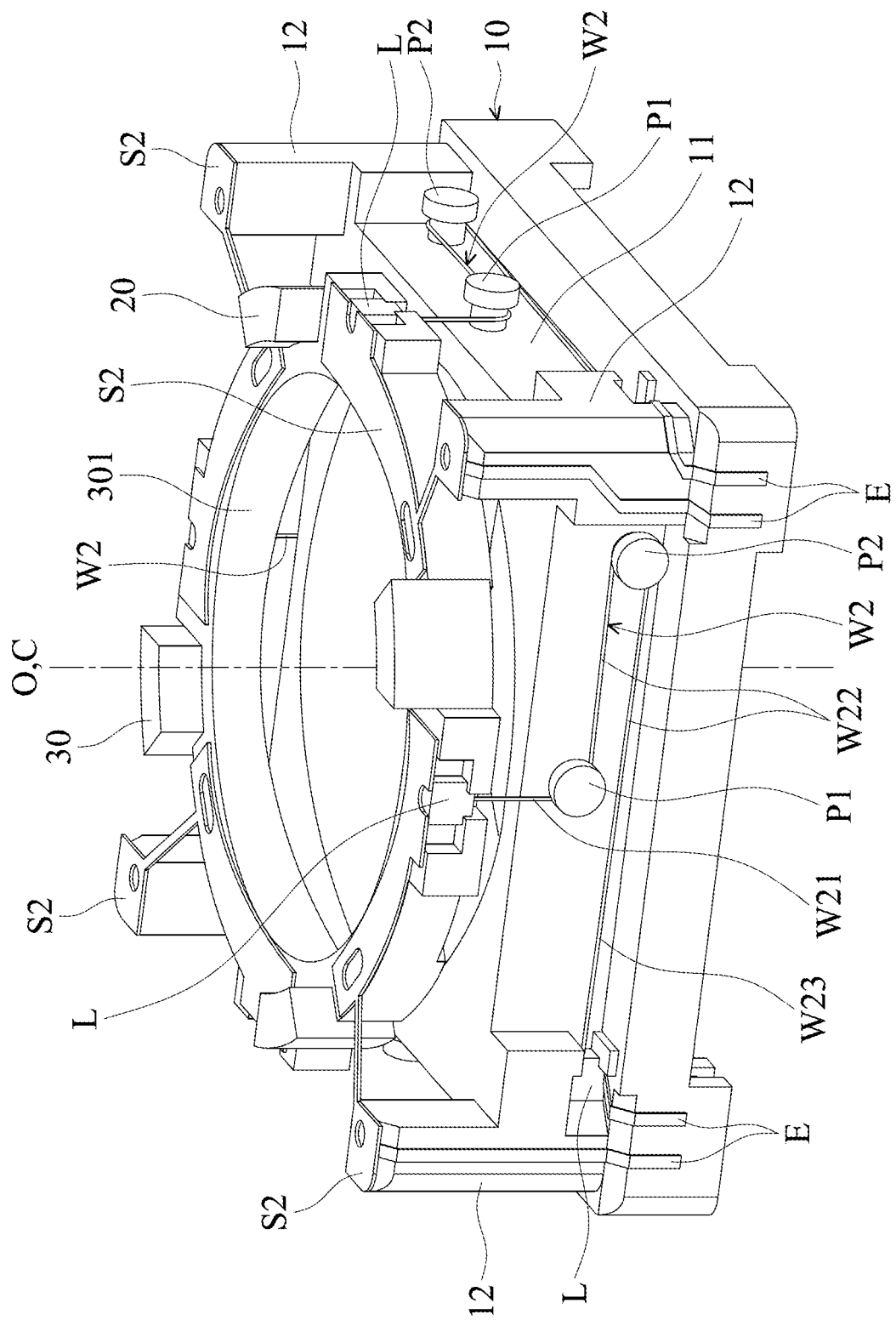
FIG. 7 is a schematic diagram of the first unit U1 after being assembled.

The connection between the holder 30 and the base 10 is described below. Referring to FIGS. 1 and 7, the holder 30 is disposed on the base 10, and an optical lens (not shown) can be disposed in the holder 30. The base 10 further has a main body 11 with a substantially square or rectangular structure and four protrusions 12. The protrusions 12 are respectively disposed at the four corners of the main body 11 and protrude from the main body 11 toward the holder 30. The holder 30 is connected to the base 10 via the second elastic elements S2 and the second biasing elements W2. The optical axis O of the optical lens coincides with the central axis C of the base 10 when in a normal state.

Specifically, the four second elastic elements S2 (such as springs comprising metal) connect to the four protrusions 12 of the base 10 with the holder 30 (as shown in FIG. 3), so that the holder 30 is movably connected to the base 10. The second biasing elements W2 are respectively disposed on the four sides of the main body 11, and the two ends of each second biasing element W2 are respectively electrically connected to conductive blocks L, wherein the conductive blocks L are respectively affixed to the holder 30 and the base 10 (for example, they are affixed to the holder 30 and the base 10 by an engaging means or an adhesive). The second biasing elements W2 can be electrically connected to the corresponding second elastic elements S2 via the conductive blocks L.

Still referring to FIG. 7, the camera module 1 further comprises a plurality of conductors E (such as conductive wires), formed on the base 10 by insert molding or 3D molded interconnect device (MID) technology. The conductors E electrically connect to the second elastic elements S2 and the second biasing elements W2 to form four independent circuits, respectively, whereby driving signals (e.g., current) can be applied to them from an external power source, and the lengths of the second biasing elements W2 can be changed to adjust the posture of the holder 30. It should be noted that, since the conductors E are formed on the base 10 by insert molding or MID technology, the number of components of the camera module 1 can be reduced and the dimensions thereof can be greatly reduced. In addition, since the second elastic elements S2 (such as springs comprising metal) are electrically conductive, the second biasing elements W2 and the conductors E can be electrically connected to each other, so that no additional wires are required in the camera module 1, saving space.

Still referring to FIG. 7, two columnar position members P1 and P2 are disposed on each side of the main body 11 of the base 10. The second biasing elements W2 are in contact with and extended around the position members P1 and P2. All the second biasing elements W2 can be divided into three sections: a first section W21, a second section 22, and a third section W23. The first section W21 is substantially parallel to the central axis C, and the second section W22 has a U-shaped structure and connects to the first section W21. The third section W23 is substantially perpendicular to the central axis C, wherein the second section W22 is connected to the first section W21 and the third section W23, and the second section W22 and the third section W23 are respectively located on the left and right sides (opposite sides) of the first section W21. With the second biasing elements W2 extending around the position members P1 and P2 to form the three sections W11, W12, and W13, the lengths of the second biasing elements W2 disposed on each side of the main body 11 can be increased. Therefore, when the second biasing elements W2 are deformed, more variation in length can be generated. Furthermore, due to the distance between the position members P1 and P2 in the direction of the central axis C, short-circuits between the first, second, and third sections W21, W22, and W23 can be avoided.

It should be understood that each of the second biasing elements W2 is electrically independent and connects to an external power source. Thus, a plurality of different driving signals can be respectively supplied to the second biasing elements W2 by the external power source, and the second biasing elements W2 can be independently controlled to have the same or different length variations. For example, when applying appropriate driving signals to the second biasing elements W2, the second biasing elements W2 may deform and have the same or different length variations. Thus, the second biasing elements W2 are able to force the holder 30 and the optical lens to linearly move in the direction of the optical axis O or the central axis C with respect to the base 10 (FIG. 8), or force the holder 30 and the optical lens so that the optical axis O can have an angular displacement relative to the central axis C of the base 10 (FIG. 9), to achieve fast optical focusing or optical image stabilization (OIS).

Figure 8:
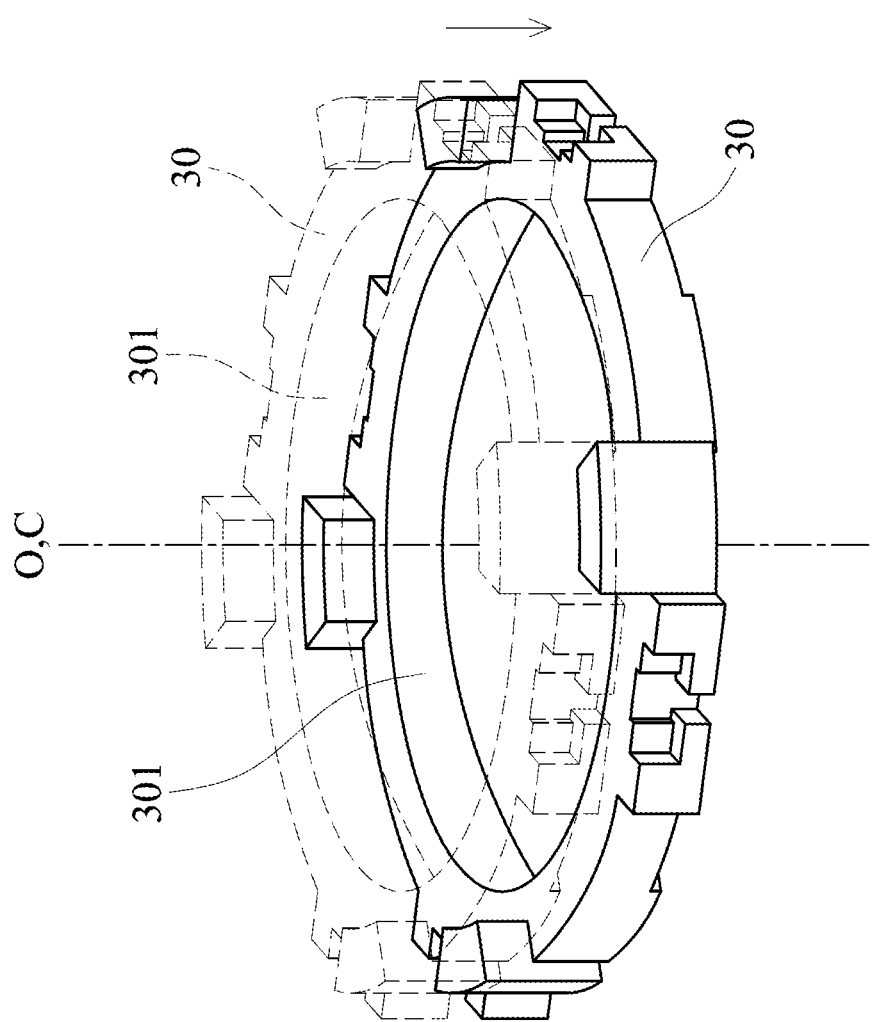
FIG. 8 is a schematic diagram of the holder moving with respect to the base.

In particular, as shown in FIG. 8, when applying driving signals to the second biasing elements W2 on the four sides of the main body 11, if the length variations thereof are substantially the same, the second biasing elements W2 can force the holder 30 and the optical lens to linearly move relative to the base 10 in the direction of the optical axis O/the central axis C.

Figure 9:
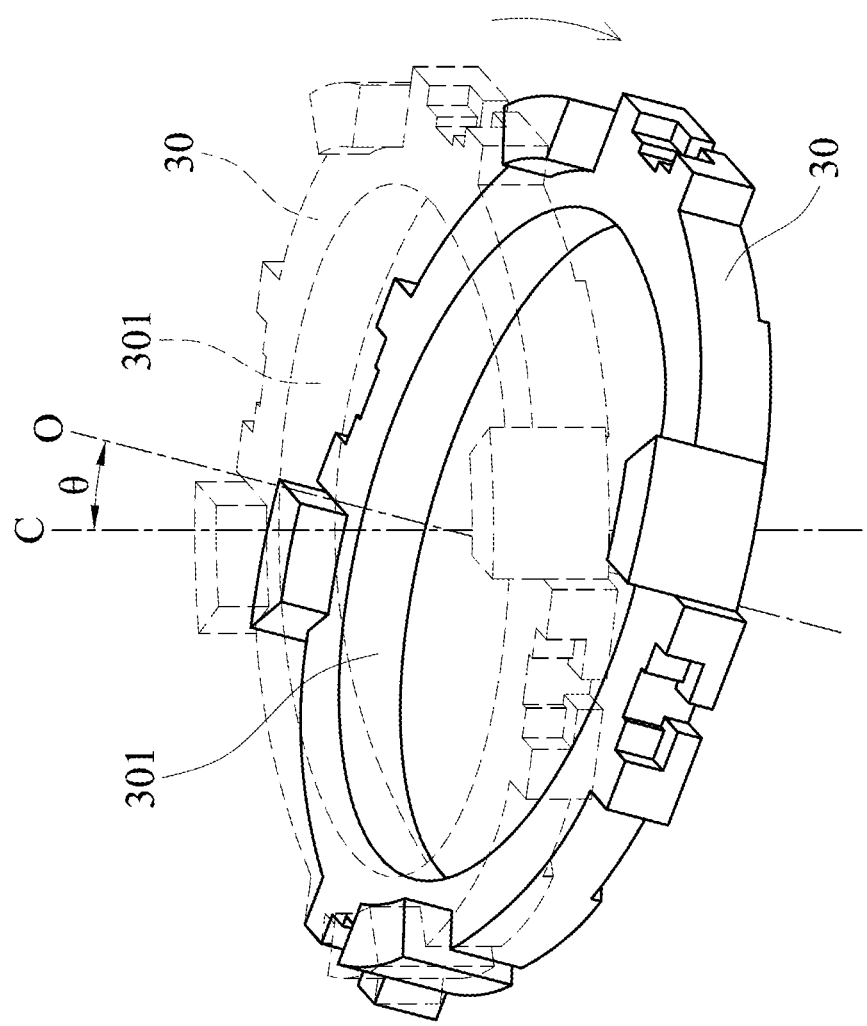
FIG. 9 is a schematic diagram of the optical axis O having an angular displacement with respect to the central axis.

On the other hand, as shown in FIG. 9, if the length variations of the second biasing elements W2 are different from each other, the holder 30 and the optical axis O of the optical lens can have an angular displacement θ relative to the central axis C of the base 10.

As described above, by appropriately applying different drive signals to the second biasing elements W2, the length variations thereof can be appropriately controlled, such that the holder 30 and the optical lens can move relative to the base 10 in the direction of the optical axis O or the central axis C, or the optical axis O can have the angular displacement θ relative to the central axis C of the base 10, thereby providing optical focus and optical image stabilization. Furthermore, in another embodiment, the camera module 1 may have only one second elastic biasing element S2 and one second biasing element W2 which form a circuit with the conductors E and an external power source. When a driving signal is applied to the second biasing element W2 to deform, the optical axis O can have an angular displacement θ relative to the central axis C, so that tilt angle compensation of the camera module 1 can be accomplished.

According to the foregoing embodiment, a method for controlling the camera module 1 is provided, comprising: applying one or more driving signals to the first biasing elements W1 to linearly move or rotate the bottom 20 and the image sensor IM relative to the base 10; and applying one or more driving signals to the second biasing elements W2 to linearly move the holder 30 and the optical lens relative to the base 10 in the optical axis O or the central axis C, or move the holder 30 and the optical lens so that the optical axis O of the optical lens has an angular displacement relative to the central axis C of the base 10.

Figure 10:
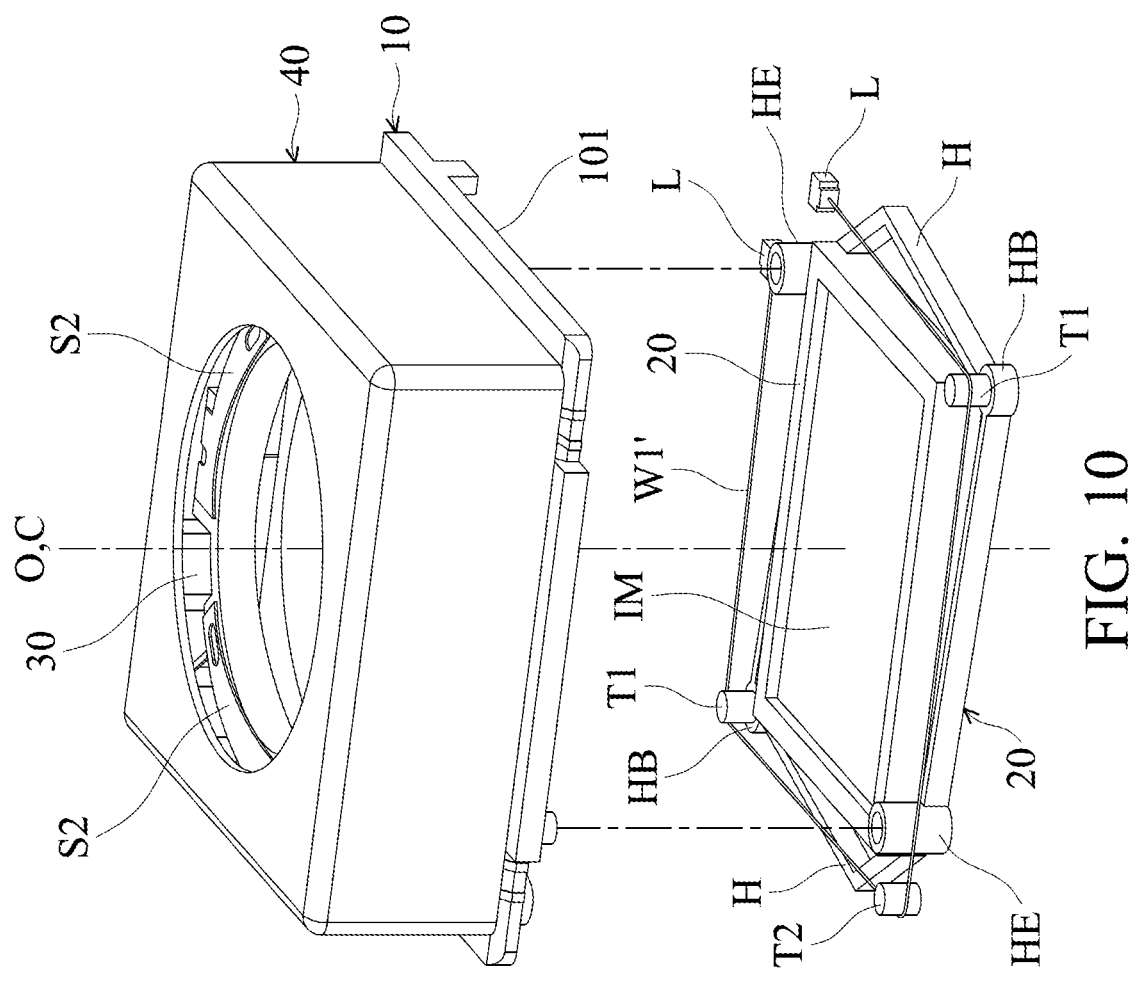
FIG. 10 is a schematic diagram of a camera module according to another embodiment of the invention.
Figure 11:
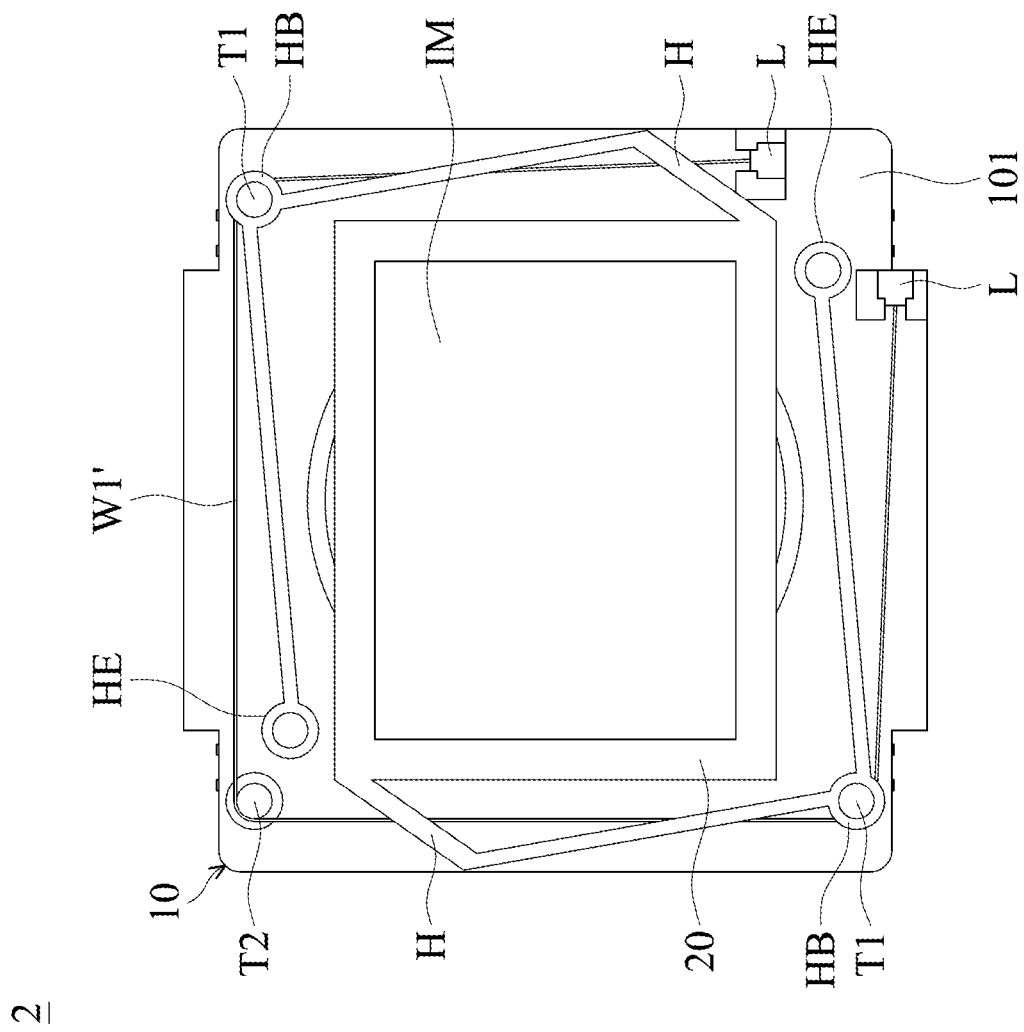
FIG. 11 is a bottom plan view diagram of the camera module in FIG. 10 after assembly.

FIGS. 10 and 11 are schematic diagrams of a camera module 2 according to another embodiment of the invention. The main difference between the camera module 2 in the present embodiment and the camera module 1 in the aforementioned embodiment is that the camera module 2 has only one first biasing element W1', a plurality of support members T1 and T2, and two flexible arms H connected to the bottom 20.

Referring to FIGS. 10-11, the first biasing element W1' surrounds the bottom 20, and the two ends thereof are respectively electrically connected to conductive blocks L which are affixed to a lower surface 101 of the base 10. Each flexible arm H has an L-shaped structure, and an end portion of the flexible arm H is connected to the lower surface 101. Furthermore, each of the flexible arms H has a bending portion HB with a hollow structure, and the support members T1 are respectively disposed therein and extended toward the base 10. The support member T2 is affixed to the lower surface 101, so that the first biasing element W1' can be tensed by the support members T1 and T2 around the bottom 20.

Figure 12:
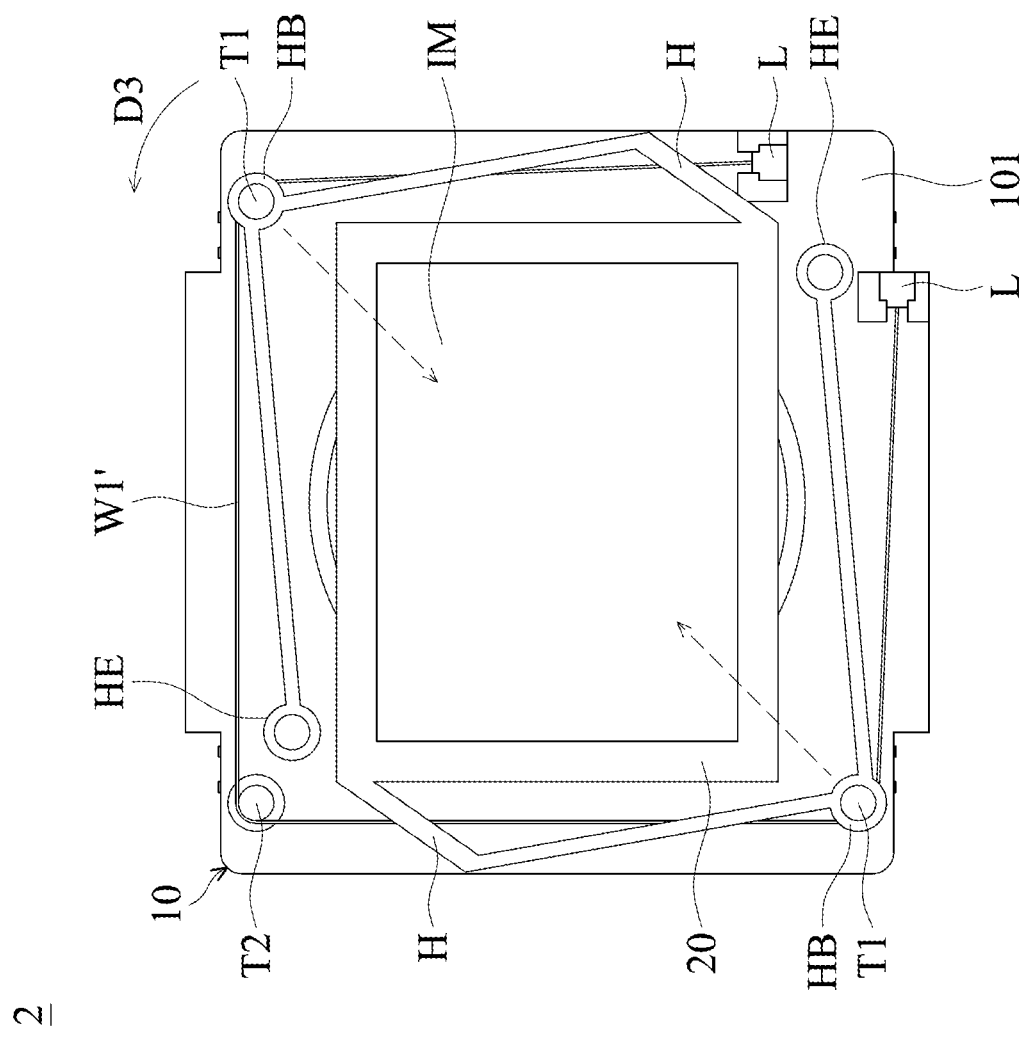
FIG. 12 is a schematic diagram of the first biasing element W1' forcing the bottom and the image sensor to rotate by the flexible arms H.

When applying a driving signal to the first biasing element W1' and deformation occurs, the first biasing element W1' forces the bottom 20 and the image sensor IM to rotate with respect to the base 10. For example, as shown in FIG. 12, when applying an appropriate driving signal to the first biasing element W1' and the first biasing element W1' contracts, the first biasing element W1' forces the support members T1 to move toward the center of the bottom 20 (along the broken lines in FIG. 12), so that the flexible arms H deform and the bottom 20 and the image sensor IM rotate in a direction D3 relative to the base 10 (rotating around the central axis C/the optical axis O), to achieve optical image stabilization.

In summary, a camera module and a method for controlling it are provided; the camera module comprises a base, a holder, an image sensor, a bottom, and at least one first biasing element. The base is affixed to a casing of an electronic device, and the holder is configured to hold an optical lens and connected to the base. The image sensor is disposed on the bottom, and the base is between the holder and the bottom. The first biasing element connects the bottom with base and is able to force the bottom and the image sensor to move relative to the base, to achieve optical focus or optical shaking compensation. Moreover, the camera module further comprises at least one second biasing element connecting the base and the holder. By applying a driving signal to the second biasing element to change the length thereof, the holder and the optical lens are able to move relative to the base. Therefore, optical image compensation of the camera module can be achieved to improve image quality.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A camera module, the profile of which has a polygonal structure when viewed from an optical axis direction, comprising:
   an optical lens;
   a base with a polygonal structure, having an opening that corresponds to the optical lens;
   a bottom, configured to fix an image sensor and being movable relative to the base; and
   a first driving assembly, configured to drive the bottom to move relative to the base, and the first driving assembly is at least partially located in the center of a first side of the camera module;
   wherein the base is affixed to an electronic device;
   wherein a light passes through the optical lens and the base in sequence before arriving at the image sensor;
   wherein the first driving assembly further includes a first driving element having an elongated structure, and a fixed end of the first driving element is connected to the base, and a movable end of the first driving element is connected to the bottom.

2. The camera module as claimed in claim 1, wherein the base is closer to a light incidence of the optical axis than the bottom.

3. The camera module as claimed in claim 1, wherein the first driving element is disposed on the first side, and when viewed from the optical axis direction, two ends of the first driving element are located on the first side.

4. The camera module as claimed in claim 1, further comprising a first elastic element having a sheet-like structure, the bottom is movably connected to the base via the first elastic element, and the first elastic element does not overlap itself when viewed from the optical axis direction.

5. The camera module as claimed in claim 4, wherein the thickness direction of the first elastic element is perpendicular to the optical axis.

6. The camera module as claimed in claim 4, wherein the first elastic element has a first cantilever, and the cantilever is located on the first side and a second side of the camera module, wherein the second side is adjacent to but not parallel to the first side.

7. The camera module as claimed in claim 6, wherein an end portion of the first cantilever is located at a first corner of the camera module when viewed from the optical axis direction.

8. The camera module as claimed in claim 7, further comprising:
a holder configured to connect an optical element; and
a second elastic element, having sheet-like shape, wherein the holder is connected to the optical element via the second elastic element.

9. The camera module as claimed in claim 8, wherein the first elastic element and the second elastic element do not overlap when viewed from a direction that is perpendicular to the optical axis.

10. The camera module as claimed in claim 9, wherein the second elastic element has a second cantilever, and when viewed from the optical axis direction, an end portion of the second cantilever is located at the first corner.

11. The camera module as claimed in claim 5, wherein two ends of a first cantilever are respectively located at a first corner and a second corner of the camera module when viewed from the optical axis direction.

12. The camera module as claimed in claim 11, wherein the two ends of the first cantilever do not overlap when viewed from any direction that is perpendicular to the optical axis.

13. The camera module as claimed in claim 1, wherein the first driving assembly has a basing element having shape-memory alloy.

14. The camera module as claimed in claim 3, further comprising:
a holder, configured to sustain an optical element; and
a second driving assembly, disposed on a side of the base, wherein the second driving assembly configured to drive the holder to move relative to the base.

15. The camera module as claimed in claim 14, wherein the second driving assembly has an elongated second driving element disposed on the side of the base.

16. The camera module as claimed in claim 15, wherein the second driving element has a bent portion.

17. The camera module as claimed in claim 16, wherein the bent portion includes a first bent sub-portion and a second bent sub-portion, wherein the first bent sub-portion is located at the central position of the side of the base.

18. The camera module as claimed in claim 17, wherein the second bent sub-portion is adjacent to a first corner of the camera module.

19. The camera module as claimed in claim 18, wherein the first bent sub-portion is located at the central position of the first corner and a second corner of the camera module.

20. The camera module as claimed in claim 14, wherein the second driving assembly has a basing element having shape-memory alloy.

* * * * *